United States Patent [19]
Kotulla

[11] Patent Number: 5,244,217
[45] Date of Patent: Sep. 14, 1993

[54] GOLF CART PULLING DEVICE

[76] Inventor: Jerry Kotulla, 2120 W. Glenview, Park Ridge, Ill. 60068

[21] Appl. No.: 19,986

[22] Filed: Feb. 17, 1993

Related U.S. Application Data

[63] Continuation of Ser. No. 668,705, Mar. 12, 1991, abandoned, which is a continuation of Ser. No. 454,183, Dec. 21, 1989, abandoned.

[51] Int. Cl.$^5$ ............................................. B62B 1/18
[52] U.S. Cl. ............................................. 280/1.5
[58] Field of Search ............... 280/1.5, 24, 62, 47.26, 280/DIG. 6; 24/197; 294/149; 224/264

[56] References Cited

U.S. PATENT DOCUMENTS

| 570,444 | 11/1896 | Armstrong | 224/184 X |
|---|---|---|---|
| 2,559,981 | 7/1951 | McBride | 280/1.5 X |
| 2,812,123 | 11/1957 | Girton | 294/150 X |
| 2,931,629 | 4/1960 | Keller | 119/109 X |
| 3,305,244 | 11/1964 | Flagg | 280/1.5 X |
| 3,328,043 | 6/1967 | Johnson | 280/1.5 |
| 4,132,427 | 1/1979 | McGee | 280/19 |
| 4,765,279 | 8/1988 | Klickstein | 119/109 |
| 4,772,057 | 9/1988 | Harvey | 224/250 X |

FOREIGN PATENT DOCUMENTS

| 3807449 | 9/1989 | Fed. Rep. of Germany | 280/1.5 |
|---|---|---|---|
| 990271 | 4/1965 | United Kingdom | 280/DIG. 6 |
| 1461930 | 1/1977 | United Kingdom | 280/1.5 |

Primary Examiner—David M. Mitchell
Attorney, Agent, or Firm—Lee, Mann, Smith, McWilliams, Sweeney & Ohlson

[57] ABSTRACT

A strap-like device for pulling a golf cart or the like. The device includes a strap which is detachably attached to the handle of the golf cart. A large loop is formed in the strap extending essentially from the handle of the golf cart over the shoulder of a person pulling the cart. A shoulder pad is slideably mounted on the strap to engage the torso of a person pulling the cart. The size of the strap is adjustable to accomodate various wearers and wearing options.

8 Claims, 2 Drawing Sheets

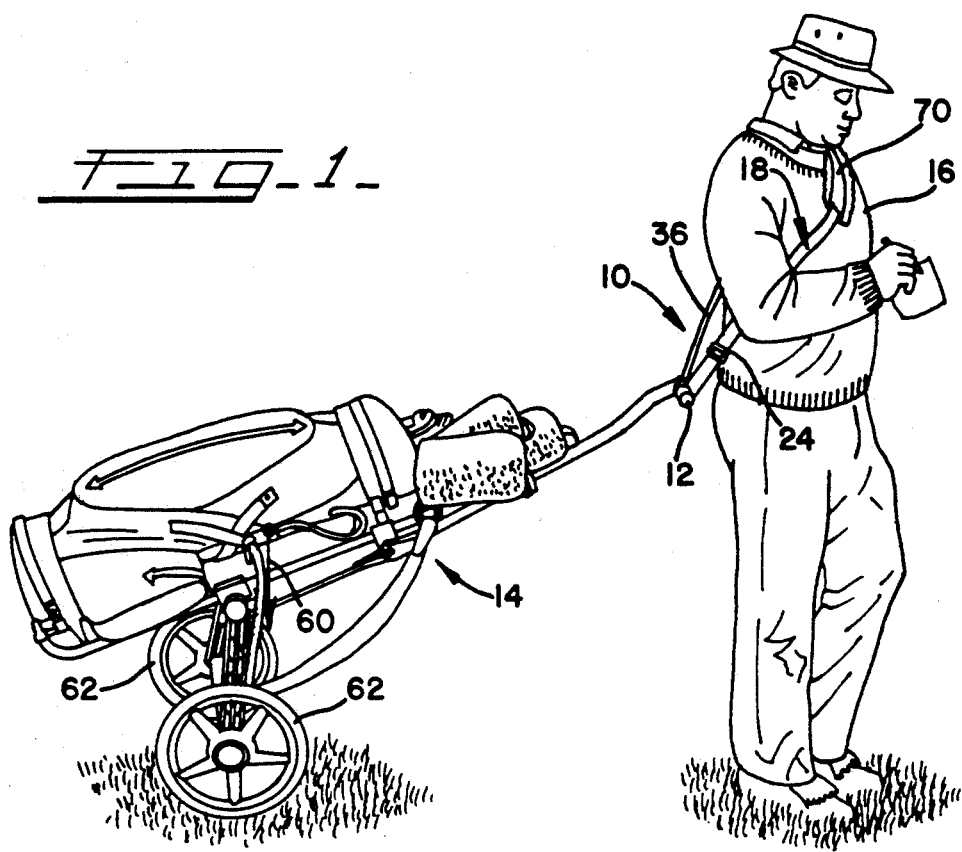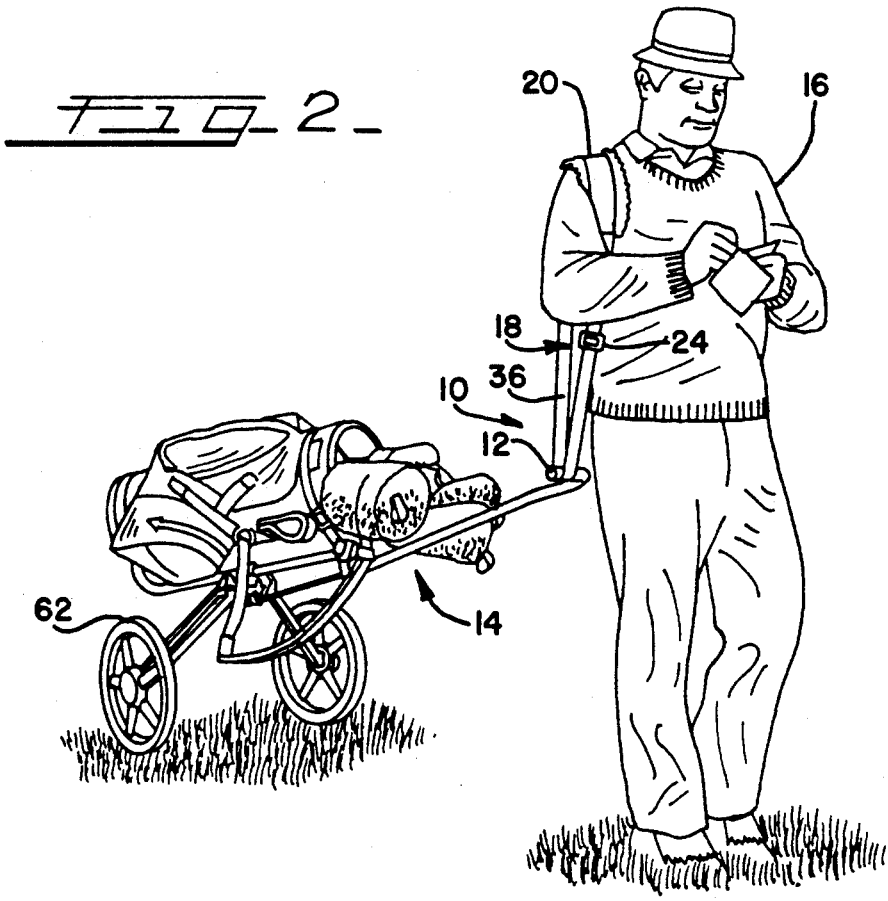

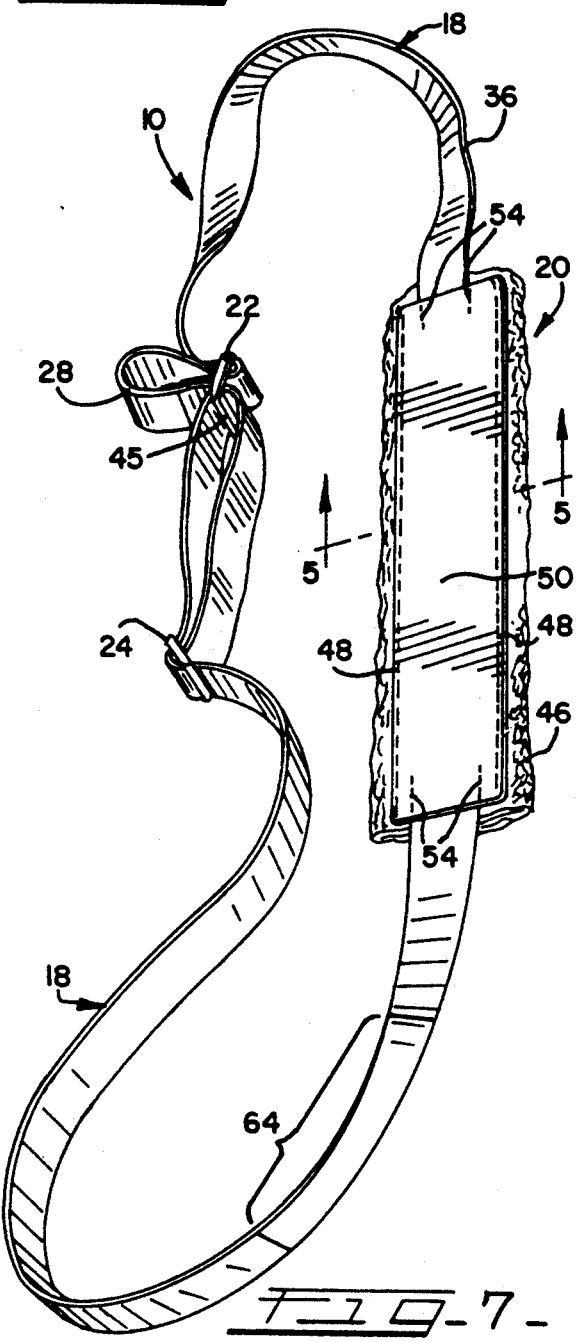
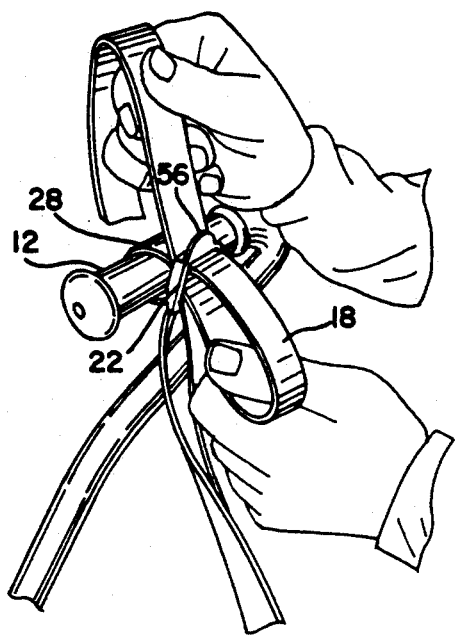
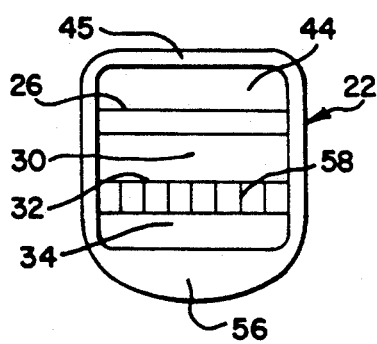
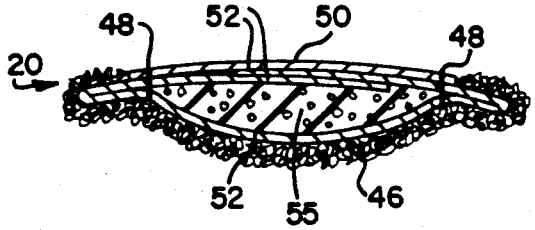
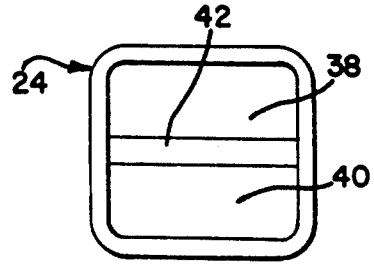

GOLF CART PULLING DEVICE

This application is a continuation of application Ser. No. 07/668,705, filed Mar. 12, 1991, abandoned, which is a continuation of application Ser. No. 07/454,183, filed Dec. 21, 1989, abandoned.

BACKGROUND OF THE INVENTION

This invention relates to pulling devices for wheeled vehicles, and in particular to a flexible, strap-like device attachable to a wheeled cart to aid in maneuvering of the cart by a person wearing the device.

Golf is becoming an increasingly popular sport, both for the thrill and satisfaction of doing well at the sport, as well as the exercise that is available to the golfer. While many golfers ride in an electric or gas-powered cart about the course, thus largely defeating the available exercise, others forego the cart and choose to either carry their bag of golf clubs, have the golf clubs carried by a caddy, or two the golf clubs behind them in a two wheeled, hand-pulled golf cart. Over a golf course having 18 holes of regulation play, the golfer will typically cover over three miles of walking distance, thus enjoying a fair amount of beneficial aerobic exercise.

When pulling a two wheeled golf cart over such long distances, the golfer's arms can become quite tired from constant pulling of the cart, this fatigue affecting the level of play after several hours on the course. Thus, many golfers will forego the two-wheeled cart in favor of a motorized cart so that their arms are not unduly tired by extraneous activity other than play of the game.

Recognizing the detrimental effect of pulling a golf cart over long distances, in the past, efforts have been made to develop carts or cart pulling devices which free the golfer's arms from the pulling task. For example, U.S. Pat. Nos. 2,559,981; 3,311,385; 3,328,043 and 3,926,448 disclose various devices for attachment to a cart for pulling of the cart. All such devices, however, are somewhat awkward in that they attach to the waist of the golfer and require either a separate belt or attachment worn by the golfer for towing the golf cart. For proper play of the game, the golfer must continually detach himself from the cart, itself an awkward procedure over 18 holes of play, with several strokes being taken during play of each hole.

SUMMARY OF THE INVENTION

The present invention is directed to a device for pulling a cart having a handle formed for grasping by a person maneuvering the cart. The device according to the invention comprises an elongated, flexible strap, with means at one end of the strap for detachably attaching the strap to the cart handle. A large loop is formed in the strap and extends essentially from the attaching means, the loop being formed for engagement over the shoulder of a person pulling the cart. Means is provided for adjusting the size of the loop to accomodate different size golfers and different modes of wear of the device. A shoulder pad is slideably mounted on the strap within the loop, the pad being positionable along the strap to engage the torso of a person pulling the cart.

In accordance with the preferred form of the invention, the shoulder pad is flexible, and includes a curved engaging surface shaped to engage a hollow in the shoulder of a person maneuvering the cart. The curved surface, when engaging the hollow in the shoulder, maintains the strap in place and largely prevents the strap from inadvertently sliding from the wearer's shoulder.

For attaching the strap to the cart, a buckle is provided on and engaging the strap, and a second, small loop is formed in the strap and attached to the buckle. The buckle is formed to grip the strap and is positionable along the strap to alter the size of the small loop, which is engaged about the handle of the cart being pulled.

For adjusting the size of the large loop worn by the person maneuvering the cart, the device includes a buckle slideably engaged on the strap and being attached to the opposite end of the strap from that secured to the cart handle. The strap passes through a guide in the grip attachment buckle, and the adjustment buckle is positionable along the strap to alter the size of the large loop. The latter buckle includes means to grip the strap to assure that the strap does not inadvertently slip to enlarge the large loop while the cart is being pulled.

In accordance with one form of the invention, shock absorption is provided in the strap. In one form of shock absorption, an elastic section is provided in the strap. In another form of shock absorption, the entire strap includes elastic material which stretches sufficiently to produce a shock absorption effect.

BRIEF DESCRIPTION OF THE DRAWINGS

The invention is described in further detail in the following description of examples embodying the best mode of the invention, taken in conjuction with the drawing figures, in which:

FIG. 1 is a schematic illustration of one means of use of the cart pulling device according to the invention;

FIG. 2 is a view, somewhat similar to FIG. 1, showing a second means of deployment of the cart pulling device according to the invention;

FIG. 3 is an enlarged view, with portions removed for clarity, showing one form of attachment of the device according to the invention to the handle grip of a golf cart;

FIG. 4 is a schematic view of the golf cart pulling device according to the invention;

FIG. 5 is an enlarged cross-sectional view taken along lines 5—5 of FIG. 4;

FIG. 6 is a schematic view of the cart handle attachment buckle; and

FIG. 7 is a schematic view of the buckle used to adjust the size of the strap.

DESCRIPTION OF EXAMPLES EMBODYING THE BEST MODE OF THE INVENTION

FIGS. 1 and 2 illustrate two means of deployment of a cart pulling device 10 according to the invention when attached to the handle grip 12 of a golf cart 14. In FIG. 1, the device 10 is worn in an essentially over the shoulder and across the chest fashion, while in FIG. 2, the device 10 is worn in an over the shoulder fashion. The means of wearing the device 10 and pulling of the cart 14 by the golfer 16 are described in somewhat greater detail below.

The cart pulling device 10 is best shown in FIG. 4, and comprises four basic elements, a strap 18, an adjustable shoulder pad 20, and a pair of buckles 22 and 24. The buckles 22 and 24 may be conventional, and are respectively shown in an enlarged fashion in FIGS. 6 and 7.

For formation of the device 10 as shown in FIG. 4, one end of the strap 18 is attached to a cross bar 26 of the buckle 22, as by stitching to itself or other conventional means. That end then leads to a small loop 28 which extends back through the buckle 22 in an opening 30 between the cross bar 26 and a second cross bar 32. The strap 18 then loops back through a further opening 34 and emerges in a large loop 36, extending through the shoulder pad 20 and through openings 38 and 40 on opposite sides of a cross bar 42 of the buckle 24 before passing through a further opening 44 in the buckle 22 around the cross bar 45 and passing back to the cross bar 42 and being secured thereto, again by stitching to itself or any other conventional means.

The shoulder pad 20 is best shown in FIGS. 4 and 5. For the sake of description, the strap 18 has been omitted from the cross-sectional view of FIG. 5.

The shoulder pad 20 is composed of a soft outer covering 46, such as a cloth-backed fleece, which is stitched by stitching 48 to a flexible backing 50, such as a length of vinyl or leather. The cloth backing 52 for the fleece 46 is shown in FIG. 5, and preferably extends beneath the flexible backing 50, forming a channel between the members 50 and 52 through which the strap 18 may pass. For appropriate guiding of the strap 18 therethrough, opposite ends of the shoulder pad 20 include guide stitching 54, as shown in FIG. 4.

It is important that the shoulder pad 20, in addition to being flexible, also engages the natural hollow formed in the shoulder of the golfer 16 in order to assure that the strap 18 does not slip from the golfer's shoulder, particularly when worn as shown in FIG. 2. To this end, the shoulder pad 20 either includes a filling 55 to cause the outer covering 46 to be curved as shown in FIG. 5, or the stitching 48 is oriented so that the curved outer covering 46 occurs as shown in FIG. 5. The curved outer covering 46 forms an engaging surface to engage the hollow in the golfer's shoulder, but is not curved so radically that a pressure point is created on the golfer's shoulder.

The small loop 28 is used for attachment of the cart pulling device 10 to the handle 12 of a golf cart 14, as best shown in FIG. 3. The loop 28 is placed over the handle 12, and the golfer then pulls the strap 18 tight through the buckle 22 about the handle grip 12 to securely attach the pulling device 10 to the golf cart 14. For quick release of the strap 18 from the handle grip 12, the golfer need only engage the protruding extension 56 of the buckle 22 in a conventional fashion.

It is preferred that the buckles 22 and 24 and corresponding strap 18 be formed such that frictional engagement of the strap 18 with itself when looping through the buckles 22 and 24 maintains the strap 18 in place when adjusted. If necessary, either or both of the buckles 22 and 24 can be formed with auxiliary gripping means, such as a series of teeth 58 formed on the cross bar 32 of the buckle 22.

Adjustment of the size of the large loop 36 is by means of adjustment of the buckle 24 along the strap 18. By judicious adjustment, the size of the loop 36 can be varied to fit the golfer or the mode of use of the pulling device 10.

Returning to FIG. 1, with the pulling device 10 attached to the cart 14, the buckle 24 is adjusted on the strap 18 so that the large loop 36 may be placed over the head of the golfer 16. The shoulder pad 20 is positioned along the strap 18 to comfortably fit in the shoulder of the golfer 16. Also, the large loop 36 is formed sufficiently large by adjustment of the buckle 24 so that the center of gravity 60 of the golf cart 14 is just forward (toward the golfer 16) of the wheels 62. This assures that the handle grip 12 is biased slightly downwardly by the weight of the golf cart 14 when pulled by the golfer 16. It is important that the center of gravity be forward of the wheels 62 rather than behind of the wheels 62, since if the center of gravity 60 is behind the wheels 62, the handle grip 12 tends to raise upwardly, making use of the pulling device 10 rather awkward. Thus, the size of the large loop 36, as adjusted by positioning of the buckle 24, is quite important to assure that the center of gravity 60 is forward of the wheels 62.

In FIG. 2, the pulling device 10 is shown worn simply over a shoulder of the golfer 16, rather than also across the chest. In this orientation, a smaller large loop 36 is required, and thus the buckle 24 is adjusted upwardly on the strap 18 (in relation to FIG. 1) to reduce the size of the large loop 36. This maintains the center of gravity of the golf cart 14 in the same orientation as shown in FIG. 1, without the center of gravity being so far forward toward the golfer 16 that undue weight on the golfer's shoulder is experienced.

As shown in FIGS. 1 and 2, the large loop 36 comprises the vast majority of the length of the strap 18, extending essentially from and to the buckle 22 adjacent the handle grip 12. The large size of the loop 36 permits easy donning and removal of the pulling device 10 from the golfer 16, and also permits freedom of movement of the golfer 16 while using the device 10. There is no attachment to the body, no supplemental hooks or belts required to be worn by the golfer, and nothing to inhibit the golfer's free movement as he follows the terrain of the golf course.

The terrain of the golf course may be a bit uneven, and if the wheels 62 of the golf cart 14 engage an obstacle or hole in the turf, the shock of doing so will be transmitted through the pulling device 10 to the shoulder of the golfer 16. For absorbing some or all of the shock, the strap 18 may include a shock absorbing section 64 as a part of the strap 18, the section 64 being a length of elastic material or the like. Alternatively, the entire strap 18 can include an elastic material which stretches and therefore absorbs shock received from the golf cart 14.

The pulling device 10 allows the golf cart 14 to automatically follow the golfer 16 wherever he may go on a golf course with very little effort or strain. With the arrangement shown and described, the golfer may traverse the golf course about as easily as a golfer employing a caddy to carry his golf bag, but without the expense.

Various changes may be made to the invention without departing from the spirit thereof or scope of the following claims.

What is claimed is:

1. A device for hands free pulling of a cart having a handle formed for grasping by a person maneuvering the cart, comprising
   a. a wheeled cart having a handle protruding therefrom for grasping and pulling by a person,
   b. an elongated, flexible strap shaped to extend from the cart handle to a person maneuvering the cart, said strap including shock absorption means in said strap, c. means at one end of said strap for detachably attaching said strap to the cart handle, said attaching means comprising a first loop formed in said one end and means for adjusting the size of said first loop, said means for adjusting having means to grip the strap and being positionable along the strap to alter the size of said first loop to engage the cart handle, d. a second loop formed in said strap and extending from said attaching means, said second loop being formed sufficiently large for removable engagement loosely over the shoulder of a person pulling the cart and being larger than said first loop, e. means for adjusting the size of said second loop, and f. a shoulder pad mounted on said strap within said second loop to engage the torso of a person pulling the cart.

2. A device according to claim 1 in which said pad is flexible, and includes a curved engaging surface shaped to engage a hollow in a shoulder of a person maneuvering the cart.

3. A device according to claim 1 in which said means for adjusting comprises a buckle slideably engaged on said strap and being attached to the other end of said strap.

4. A device according to claim 3 in which said attaching means includes a guide through which said strap passes, and said buckle is positionable along the strap to alter the size of said second loop.

5. A device according to claim 4 in which said buckle includes means to grip said strap.

6. A device according to claim 1 in which said shock absorption means comprises an elastic section of said strap.

7. A device according to claim 1 in which said shock absorption means comprises said strap including an elastic material.

8. A device according to claim 1 in which said shoulder pad is slideably mounted on and is positionable along the strap.

* * * * *